United States Patent [19]

Beyer et al.

[11] 3,859,153

[45] Jan. 7, 1975

[54] REFRACTORY LAMINATE HAVING IMPROVED GREEN STRENGTH

[75] Inventors: James N. Beyer, Wilmington; Earl P. Moore, Jr., Hockessin; Robert L. Rusher, Wilmington, all of Del.

[73] Assignee: E. I. du Pont de Nemours and Company, Wilmington, Del.

[22] Filed: May 25, 1973

[21] Appl. No.: 363,803

Related U.S. Application Data

[63] Continuation-in-part of Ser. No. 148,956, June 1, 1971, Pat. No. 3,751,276, which is a continuation-in-part of Ser. No. 49,916, June 25, 1970, abandoned.

[52] U.S. Cl............... 161/182, 106/38.3, 106/38.9, 106/38.27, 117/5.1, 117/70 R, 117/70 S, 117/169 A, 161/206, 164/26, 164/41
[51] Int. Cl............................................. B32b 31/00
[58] Field of Search........... 164/26, 34, 41; 117/5.1, 117/70 R, 70 S, 100 B, 100 S, 169 A, 104 A, 105.5; 161/206, 162, 182; 106/38.3, 38.9, 38.27

[56] References Cited
UNITED STATES PATENTS

| | | | |
|---|---|---|---|
| 2,380,945 | 8/1945 | Collins | 22/188 |
| 2,574,902 | 11/1951 | Bechtold et al. | 252/313 |
| 2,892,797 | 6/1959 | Alexander et al. | 252/313 |
| 3,007,878 | 11/1961 | Alexander et al. | 106/286 |
| 3,012,973 | 12/1961 | Atkins | 252/313 |
| 3,165,799 | 1/1965 | Watts | 106/38.35 |
| 3,232,771 | 2/1966 | Pearce | 106/38.35 |
| 3,270,382 | 9/1966 | Emblem et al. | 106/38.35 |
| 3,292,220 | 12/1966 | Emblem et al. | 106/38.35 |
| 3,396,775 | 8/1968 | Scott | 164/26 |
| 3,745,126 | 7/1973 | Moore, Jr. | 117/100 S X |

*Primary Examiner*—William D. Martin
*Assistant Examiner*—Dennis C. Konopacki

[57] ABSTRACT

A rapid process is provided for forming a refractory laminate having improved green strength on the surface of a substrate by dipping the substrate alternately, in either order, into (A) a slurry of particulate refractory material in a sol of negatively charged colloidal particles of an inorganic substance and (B) a slurry of a particulate refractory material in a sol of positively charged colloidal particles of an inorganic substance, the improvement which comprises substituting (C) a slurry of a zircon, alumina or an aluminosilicate in a solution of an alkaline ionic silicate for (A) in the third or fifth dip when the first dip is (A) or in the fourth dip when the first dip is (B) and repeating (C) and (B) until a laminate of the desired thickness is built up on the substrate. The process is particularly suited for making expendable, refractory shell molds for precision investment casting of metals by the so-called "lost-wax" technique.

19 Claims, No Drawings

REFRACTORY LAMINATE HAVING IMPROVED GREEN STRENGTH

CROSS REFERENCE TO RELATED APPLICATIONS

This application is a continuation-in-part of our co-pending application Ser. No. 148,956, filed June 1, 1971, now U.S. Pat. No. 3,751,276 which in turn is a continuation-in-part of application Ser. No. 49,916, filed June 25, 1970, now abandoned.

BACKGROUND OF THE INVENTION

Various methods have been proposed for the formation of refractory shell molds for precision investment casting. Generally a disposable pattern, which is usually made of wax or plastic is dipped into a refractory slurry consisting of a suspension of fine refractory grain in a bonding liquid. After dipping, the excess slurry is drained from the coated pattern and while the coating is still wet it is stuccoed with coarse refractory particles. The binder is then generally capable of hardening by drying at room temperature. The process of dipping and stuccoing and drying between coats is repeated until a refractory shell having sufficient thickness to resist stresses incurred in subsequent casting operations is built up around the pattern. The disposable pattern is then usually removed from the refractory shell mold by flash dewaxing furnaces or boiling solvent baths, but most preferably by using steam autoclaves. The refractory shell mold is then fired to prepare it for metal casting.

In such conventional methods, the time required to dry between the application of each coating may vary from 30 minutes to 4 hours or more depending on temperature, humidity, air flow and complexity of the pattern. As a consequence, a great deal of time and expense is incurred in making the desired molds.

In order to reduce the time required to make shell molds chemical methods for rapid setting of the binder coatings have been proposed. In one such proposal, a gaseous reactant is used to set the binder. U.S. Pat. No. 2,829,060 discloses the use of carbon dioxide to set sodium silicate-bonded shells containing ammonia. U.S. Pat. No. 3,455,368 discloses the use of ammonia gas to set hydrolyzed ethyl silicate or acidified aqueous colloidal silica-bonded shells. U.S. Pat. No. 3,396,775 discloses the use of volatile organic bases in order to set shells bonded with hydrolyzed ethyl silicates.

Another approach has been to use an acidified aqueous colloidal silica to gel a basic colloidal silica and vice versa. In this approach both binders are negatively charged and gelation occurs because of pH changes. This system is described in a paper by Shipstone, Rothwell and Perry, "Drying Ceramic-Shell Moulds," British Investment Casters' Technical Association, 9th Annual Conference. However, systems based on gelling due to pH changes have not found wide spread acceptance because gelation is slow and the resulting wet gels are weak. This gives rise to sloughing-off of the early coats during subsequent dipping, resulting in the contamination and gelation of the dipping baths or slurries.

A third rapid setting approach in the art employs sodium silicate as the binder with mono-ammonium phosphate and magnesium oxide in the stucco as a gelling agent. This is described in an article by Dootz, Craig, and Peyton, "Simplification of the Chrome-Cobalt Partial Denture Casting Procedure," J. Prosthetic Dentistry, Vol. 17, No. 5, pages 464–471, May 1967.

A fourth approach employs an ethyl silicate dip coat which is set with aqueous colloidal silica containing ammonia. This is disclosed in an article by Shepherd, "Adaptation of the Ceramic Shell Mould to Meet Mass Production Requirements," British Investment Casters' Technical Association.

A fifth approach has been to add a volatile, organic solvent to the silica sol. Relatively rapid gelling is obtained by allowing the solvent (usually an alcohol) to evaporate. For a simple casting the time required for evaporation may be only several minutes, but for a complex casting evaporation may require several hours, since diffusion of solvent from deeply recessed areas or blind core areas is slow.

Volatile solvents and gaseous ammonia present flammability, toxicity and air pollution problems to the foundry. These problems have contributed to the slow acceptance of the present fast-setting systems.

In all of the prior art processes discussed above, it is difficult to obtain uniform coverage of the disposable pattern in the case of intricate parts containing deeply recessed areas or blind cores. Blind cores in particular are difficult to coat properly. Viscous slurries penetrate slowly, trapping air and easily blocking passage of slurry into the corners. This leads to defective castings and a high scrap rate. In the prior art fast-set shell processes the problem is magnified because it is necessary to get the setting agent in and out of the recessed areas and blind cores as well as the slurry itself. If the excess setting agent is not removed it will contaminate and reduce the life of the slurry bath. This is not a sudden dramatic step; instead, there is a gradual deterioration of the bath stability and the quality of the shells produced.

All of the problems of the prior art appear to have been answered by a unique process which yields rapid setting by the application of alternate layers of sols of oppositely charged colloidal particles in which are suspended highly refractory powders. In other words, the surface on which the laminate is to be formed is dipped into a slurry containing positively or negatively charged colloidal particles and then into a slurry containing colloidal particles having a charge opposite that of the charge on the colloidal particles applied in the next preceding layer. However, the unfired or "green" strength of such refractory laminates is far below the "green" strength of a laminate prepared by a dry-between-coats process. As a consequence, the laminate has a tendency to crack upon being dewaxed in a steam autoclave.

SUMMARY OF THE INVENTION

It has now been found that a refractory laminate having improved green strength can be formed on the surface of a substrate by dipping the substrate alternately, in either order, into (A) a slurry of particulate refractory material in a sol of negatively charged colloidal particles of an inorganic substance and (B) a slurry of a particulate refractory material in a sol of positively charged colloidal particles of an inorganic substance, the improvement which comprises substituting (C) a slurry of zircon, alumina or an aluminosilicate in a solution of an alkaline ionic silicate for (A) in the third or fifth dip when the first dip is (A) or in the fourth dip when the first dip is (B) and repeating (C) and (B) until a laminate of the desired thickness is built up on the substrate.

Interaction between the negatively charged colloidal particles and the alkaline ionic silicate with the positively charged colloidal particles results in a setting action which immobilizes the coatings as they are applied, making it unnecessary to dry between dips.

In a preferred embodiment, the coated pattern may be stuccoed between each dip with a relatively coarse refractory grain.

While any desired refractory grains can be used in preparing a slurry from the sol of the positively and/or negatively charged particles, including fused silica, the latter should not be used to prepare a slurry of the solution of the alkaline ionic silicate. The high alkalinity of the silicate solution imposes a large negative charge on the colloidal sized particles of silica in suspension. As a result, the slurry becomes highly thixotropic and virtually unmanageable. In addition, the high alkalinity attacks the silica and dissolves it, causing the viscosity to increase with ultimate gellation of the slurry occurring. Since it is important that the viscosity of the slurry is low enough to allow it to flow readily into crevices and to drain off of the pattern easily, such a result is intolerable. An even more important problem that arises when fused silica is used in the alkaline ionic silicate solution is that poor shell refractory properties are obtained. Preferably, zircon or an alumino-silicate is employed with the alkaline ionic silicate. Silica may be used as the stucco for this coating, however, unless maximum shell refractoriness is desired, and then zircon, alumina, or alumino-silicate stuccoes should be used, i.e., silica should not be used.

In the practice of this invention it is preferred that the positively charged colloidal particles are composed of a silica core coated with a polyvalent metal-oxygen compound. In a particularly preferred embodiment the positively charged particles are composed of colloidal silica coated with alumina.

In the manufacture of expendable, ceramic shell molds for precision investment casting of metals by the process of this invention, a disposable pattern of the metal casting is dipped alternately into the slurries as previously described. In a particularly preferred embodiment, a slurry of a negative sol is first applied followed by a slurry of a positive sol, a slurry of a solution of an alkaline ionic silicate and a slurry of a positive sol with the latter two applications repeated. Alternatively, the alkaline ionic silicate can first be applied in the fifth as opposed to the third layer. The slurry used for the first coat (prime coat) contains relatively fine refractory grain; the slurry used for the second coat may contain fine refractory grain (prime coat) or coarser refractory grain (back-up coat); the slurries used for all subsequent coats contain coarser refractory grain (back-up coats). The coated pattern is drained between each dip and is preferably also stuccoed between each dip with a relatively coarse refractory grain.

In an alternate embodiment, a prime coat slurry of a positive sol is first applied followed by a prime or back-up coat slurry of a negative sol and then a back-up coat slurry of a positive sol and a back-up coat slurry of an alkaline ionic silicate, with the latter two applications repeated one or more times.

Regardless of whether the first slurry applied to the pattern is made with a positive or negative sol, the last coat must be made from a slurry containing a positive sol and not the alkaline ionic silicate. If the alkaline ionic silicate is used in the slurry forming the last coat the shell will form surface cracks and delaminate on drying.

This invention also includes refractory laminates and refractory laminate articles, such as shell molds, made by the above-described process. The laminates comprise sequential layers, in either order of (A) a gel of negatively charged colloidal silica particles and (B) a gel of positively charged colloidal particles, wherein (C) a gel of an alkaline ionic silicate is substituted for (A) in the third or fifth layer when the first layer is (A) or in the fourth layer when the first layer is (B) and further layers of (C) and (B) until the desired thickness is obtained.

In a preferred embodiment, the negatively charged colloidal particles are colloidal silica particles, the positively charged colloidal particles are alumina-coated colloidal silica particles, and the gel layers contain and/or are separated by intermediate layers of particulate refractory material or inorganic compound.

In the practice of this invention it is necessary that the first layer applied to the pattern is a sol of negatively or positively charged colloidal particles rather than a solution of an alkaline ionic silicate. This necessity arises because of interaction between the metal to be cast and the mold wall which takes place when the first layer next to the metal to be cast is a gel of an alkaline ionic silicate. Further, an alkaline ionic silicate has poor refractoriness and its proximity to the molten metal being cast may give a poor finish to the metal and poor dimensional precision to the casting. In order to obtain the maximum degree of strength with a minimum number of coats, the alkaline ionic silicate solution is first applied as the third coat. Alternatively, however, the alkaline ionic silicate may be first applied as the fourth or fifth coat depending on the construction sequence employed. It is preferred to apply the alkaline ionic silicate for the first time in the third coat, however, since a six-layered laminate can thus be prepared which dries as fast, but is three to five times as strong as an eight layer laminate prepared by using alternate layers of sols of oppositely charged particles.

Any number of coatings can be applied in the preparation of the laminate as desired. However, six or eight coatings are usually sufficient. The mechanism by which the surprising increase in "green" or unfired strength is achieved is not entirely understood since gelled layers of alkali silicates are not noted for strength. However, it has been determined that the layer of positively charged colloidal particles of an inorganic substance which is normally weak or soft, particularly by comparison with a layer of negatively charged colloidal particles of an inorganic substance, becomes extremely strong upon interaction with the alkaline ionic silicate. While it is known that an alkaline ionic silicate forms a hard glossy layer on dry down, in the practice of this invention the silicate is chemically gelled and then dried down. The resultant silicate layer is relatively weak and chalky while the adjacent layer of positively charged particles becomes extremely strong. The overall result is a shell having a 2 to 5 fold increase in green strength over prior laminates prepared by gellation through interaction of layers of oppositely charged particles.

The practical significance of this severalfold increase in unfired strength is that the shell is now strong enough to be dewaxed in a steam autoclave without cracking. A further important attribute is that thinner shells are possible with some shell compositions of this invention, i.e., six rather than eight coats. The thinner shell is less costly to make since it requires less raw material, construction time and drying time, a factor of great significance commercially.

In addition to affording a surprising improvement in green strength permitting use of a thinner mold, the practice of this invention offers a number of additional advantages over prior art processes. The instant process is rapid because it is not necessary to dry between coats. As soon as one coat has been applied and, if desired, stuccoed, the coated pattern can be dipped in the next bath. When this is done substantially instantaneous coagulation of the previous coat occurs. A dip of 5 seconds is sufficient to set the previous coat and add an additional slurry layer. For practical purposes 15 seconds to 1 minute is required to apply a complete coat including dipping, draining and application of stucco. Thus a shell of six coats is readily prepared in less than 10 minutes. Even this short length of time could be reduced if desired.

Another advantage of the process of this invention is that the layers produced are unusually smooth and uniform in thickness regardless of the configuration of the pattern. It is believed that this is due (in part if not totally) to the fact that the coats or the layers of slurry are gelled onto the previous coat and not simply added on by wet pick up. In addition the process can be operated with slurries at lower viscosities than conventional slurries, and as a result passage through constricted openings is facilitated.

Still another advantage of the process of this invention over prior art rapid shell processes resides in the fact that it is not necessary to delay between dips to permit a chemical setting agent or volatile solvent to drain or diffuse out of recessed and/or blind core areas because each slurry acts as a substantially instantaneous setting agent for the previous coat. Since no chemical setting agent is required there are no defects in the castings resulting from failure to adequately remove any setting agent from recessed areas and blind cores nor is there any contamination of slurry baths due to inadequate removal of any setting agent.

A further significant advantage of this invention is the fact that the thickness of any layer deposited does not depend entirely upon the viscosity o the slurry. Again this is believed to be attributable to the fact that the layers of slurry are gelled onto the previous layers rather than being retained by wet pickup and viscosity controlled drainage. Because of this feature it is possible to use low viscosity slurries and obtain coatings of adequate thickness. This is an advantage because air trapped in deeply recessed areas or blind cores easily blocks the passage of a viscous slurry leading to "plus" metal in the casting. In prior art processes it is not practical to use low viscosity slurries because they drain rapidly leaving very thin layers. To build up a shell of the desired thickness using low viscosity slurries by prior art processes requires a very large number of dippings, making the cost prohibitive.

Other advantageous features of the invention will become apparent from the following detailed description.

DETAILED DESCRIPTION OF THE INVENTION

The invention will be detailed with particular reference to the formation of expendable, refractory shell molds for the precision investment casting of metals.

NEGATIVE SOLS

Among the negative sols which can be used in this invention are silica sols composed of substantially discrete, dense, non-agglomerated negatively charged, colloidal particles of silica dispersed in a suitable liquid medium. The concentration of silica in these sols can be as low as 5% and as high as 60% by weight. However, it is preferred that the silica content be at least 25% by weight. For the purposes of this invention, it is most preferred that the silica concentration be between 25 and 40% by weight.

The average diameter of the silica particles should be between about 1 and 150 millimicrons. It is preferred that the average silica particle diameter be in the range of 5–50 millimicrons and most preferred that it lie between 5 and 16 millimicrons.

The pH of the silica sol may range from 10.5 down to 7.5 or even lower with satisfactory results. The pH which is preferred is between 8.5 and 10, as in the commercial "Ludox" colloidal silica sols. It is not necessary however that the silica sol be strongly basic, since the setting action in the process of this invention depends on interaction between negatively and positively charged binders, not upon pH changes. Therefore, it is only necessary that the particles be negatively charged.

Positively charged stabilizing counter ions for the colloidal silica particles in the sols are $Na^+$, as in "Ludox" LS,HS,SM, and AM; $NH_4^+$, as in "Ludox" AS; $K^+$, $Li^+$ and quaternary ammonium. Silica sols whose particle surfaces have been modified with metal oxides to enhance negative character, such as "Ludox" AM with aluminate-modified silica, are also useful.

Other negative sols can be used in place of silica sols. Examples include sols of naturally occurring clays of the bentonite, attapulgite, and kaolinite types.

The liquid medium for suspending the colloidal particles can be water, alone or mixed with low molecular weight water-miscible alcohols such as methanol and isopropanol or other polar organic liquids, or it can be one or more of these organic liquids free of water. The preferred medium for this invention is water.

ALKALINE IONIC SILICATES

Various types of alkaline ionic silicates have been found suitable for the process of this invention. Thus, alkali metal silicates as aqueous solutions can be used. Useful concentrations of silicate solids expressed as $SiO_2$, can vary from 15–30% higher, with only the restriction imposed by excessive viscosity limiting the concentration. For the purposes of this invention the preferred concentration of $SiO_2$ is 18–20%.

The alkali metal silicates which are useful include the sodium, potassium and lithium silicates. In the case of the sodium and potassium silicates, $SiO_2:Na_2O$ and $SiO_2:K_2O$, molar ratios can be 2:1 or lower and up to 4:1 or higher; the preferred ratios are between 2.5:1 and 3.5:1. In the case of the lithium silicates the $SiO_2:Li_2O$ ratio can be 3.5:1 or less up to very high values such that the size of the molecules are well into the colloidal range.

In addition to alkali metal silicates, quaternary ammonium silicates can be used. Mixtures of alkaline ionic silicates and colloidal silicas can also be used.

POSITIVE SOLS

Preferably the positively charged colloidal particles are composed of a silica core coated with a polyvalent metal-oxygen compound. The sols of the latter type are fully described in U.S. Pat. No. 3,007,878. As indicated in that patent the polyvalent metal-oxygen compound which can be used to provide a positive surface charge on colloidal silica particles can be any compound of the class of metal oxides, metal hydroxides and hydrated metal oxides of trivalent aluminum, chromium, gallium, indium, and thallium or tetravalent titanium, germanium, zirconium, tin, cerium, hafnium and thorium. Because of cost it is preferred that the positive sol be an aqueous dispersion of alumina-coated colloidal silica particles of the type illustrated in FIG. 1 of U.S. Pat. No. 3,007,878.

An example of a charged alumina-coated silica sol which is particularly useful in this invention is one in which there is one mol of aluminum per mol of surface silica and which is prepared by the following process:

264 lbs. of "Ludox" HS colloidal silica containing 40% $SiO_2$ by weight, the silica particles having an average particle size of 12–15 millimicrons and a specific surface area of about 215 $M^2/g$. $SiO_2$ are adjusted to pH 7.50 with 821 grams of 1:1 mixture of a concentrated hydrochloric acid in water. The sol is mixed with 62.8 lbs. of 50% chlorohydrol ($Al_2(OH)_5Cl$) and 61.7 lbs. of water by introducing it at a rate of 25 lbs./minute into a centrifugal pump circulating the basic aluminum chloride solution. The clear fluid intermediate product is heated to 60°C. in one-half hour and at 60°C. for 2 hours, cooled to 20°C., and stirred with a Lightnin mixer as well as circulated with the pump as 600 grams of magnesium hydroxide dispersed in 1800 grams water are introduced in 5 minutes to bring the pH to 5.65. Agitation and circulation are continued for 2 hours. The clear stable product contains 26.4% $SiO_2$, 4.2% $Al_2O_3$, 1.0% Cl and 0.23% MgO. The mol ratio of aluminum to surface $SiO_2$ is 1:1. The pH of the product after several weeks aging is 4.60, the viscosity is 15 cps, and the specific gravity at 25°C. is 1.23. The product (referred to hereinafter as Ludox 130M) is the positive sol which is used in the examples set forth hereinbelow.

Positive sols of the preferred type exhibit two unique chemical properties which make them highly satisfactory for use in this invention:

1. At a pH higher than about 6.0, the charged alumina coating further polymerizes, causing rapid aggregation of the colloidal particles and producing a stiff gel structure.

2. The affinity of the charged colloidal particles for negative materials such as colloidal silica and silicates is very strong.

These two effects combine to produce strong, tough gel polymers. It is the integrity of these gels which enable molds to be prepared rapidly without intermediate dryings.

Ludox 130M is stabilized by chloride ion. As described in U.S. Pat. No. 3,007,878, other anions, such as formate, acetate, lactate, nitrate, bromide, perchlorate, bromate and trichloroacetate can be used instead of chloride.

Other positive sols can be used in this invention in place of the sol composed of colloidal silica particles coated with polyvalent metal-oxygen compound. In particular, sols from a number of commercially available dispersible colloidal aluminas such as "Dispal" (Continental Oil Co.), "Alon G" (Cabot Corp.) and "Super-Ox" (Merkl Research Co.), can be used.

REFRACTORY GRAIN

In building shell molds in accordance with this invention, any finely divided refractory material may be used provided that it does not react with the binders and that silica is not used with the alkaline ionic silicate. Among suitable refractory materials are zircon, molochite, fused silica, sillimanite, mullite and alumina. To obtain castings with a smooth surface finish, all the refractory grain in the primary or first coating composition should pass a 100-mesh sieve and preferably 85% should pass a 200 mesh sieve. Even finer mesh refractory may be employed for a better surface finish and such are preferred in most instances. In subsequent coatings the refractory may be much coarser, but it is preferred that all the material pass a 50 mesh sieve. These mesh sieve numbers correspond to the Standard U.S. Sieve Series.

The refractory material used for the stucco is preferably a coarser grade of the same refractory grain used in the slurry composition. For example, if refractory in a prime coat slurry is zircon with approximately 75% passing the 325 mesh sieve, the refractory used for the stucco can also be zircon in the range of −80 to 140 mesh. It is not essential, however, that refractory material of the same composition should be used for both the stucco and the slurry. Examples of refractory mate-

TABLE 1

| Shell Option | Coat No. | | | | | | | |
|---|---|---|---|---|---|---|---|---|
| | 1 | 2 | 3 | 4 | 5 | 6 | 7 | 8 |
| A | Neg. Sol.-p* | Pos. Sol.-b* | Alk. Sil.-b | Pos. Sol.-b | Alk. Sil.-b | Pos. Sol.-b | Alk. Sil.-b | Pos. Sol.-b |
| B | Pos. Sol.-p | Neg. Sol.-b | Pos. Sol.-b | Alk. Sil.-b | Pos. Sol. | Alk. Sil.-b | Pos. Sol. | |

*p = prime coat; b = back-up coat rials suitable for stucco are zircon, zirconia, sillimanite, mullite, fused silica, alumina and fire clay grog.

SLURRIES

The number and type of coating slurries used in the practice of this invention is determined by which of two main shell structure options is selected. The major difference between these options being the type of binder sol used in the slurry forming the first coat as shown in Table 1:

The shell of option A will require a minimum of three different slurries, as follows:
1. Negative silica sol prime coat slurry.
2. Positive silica sol back-up coat slurry.
3. Alkaline silicate solution back-up coat slurry.

The shell of option B will require a minimum of four slurries, as follows:
1. Positive silica sol prime coat slurry.

2. Negative silica sol back-up coat slurry.
3. Positive silica sol back-up coat slurry.
4. Alkaline silicate solution back-up coat slurry.

The prime coat slurries differ from the back-up coat slurries mainly in the particle size of the refractory powders suspended in the liquid binders. The refractory powders used in prime coat slurries are of very small diameter, i.e., 99% by weight passes through a 325 mesh screen, in order to impart the smoothest possible surface to the metal casting and replicate the finest detail of the pattern. The refractory powders used in back-up coat slurries are generally of larger particle size, i.e., 99% by weight retained on 325 mesh screen and perhaps 90% passes through a 50 mesh screen, in order to build the outer layers of the shell quickly with maximum air permeability consistent with adequate unfired shell strength.

The slurries of this invention can be prepared with any suitable refractory powders using any desired method. For example, the refractory flour may be added to the sol or solution while mixing in with a propeller-type agitator and, if desired, a wetting agent may be added to improve the wettability of the slurry onto the pattern. Wetting agents such as Ultrawet 60L (Atlantic Refining Company) should be used at the lowest effective concentration to minimize minimize foaming. Further details of some suitable components and processes which can be used in preparing the slurries of this invention can be found, for example, in U.S. application Ser. No. 148,956.

PATTERN MATERIALS AND CLEANING

Conventional wax and plastic expendable patterns of the object to be reproduced in metal are prepared. These patterns are then affixed to a sprue and runner system, giving the usual cluster arrangement needed to produce them in multiple. The pattern assembly or cluster is cleaned with a suitable solvent such as methyl ethyl ketone, trichloroethylene or alcohol mixtures to remove soil and release agents used in their preparation. The solvent cleaned assembly is dried and as such is ready for dipping in the prime coat slurry. When wettability is a problem when the colloidal silica prime coat slurry is used, a one to two percent "Cab-O-Sil" M-5 (Cabot Corp.) solution in isopropanol provides a thin hydrophilic film which vastly improves wettability. This "Cab-O-Sil" coating, however, must be dried before dipping the pattern assembly into the slurry. "Cab-O-Sil" is a silica aerogel made by flame hydrolysis of silicon tetrachloride.

Although wax and plastics are the preferred expendable pattern materials others such as low-melting tin-bismuth alloys may also be employed.

DIPPING

In the shell building process a solvent cleaned, expendable pattern assembly such as wax is dipped into a prime coat slurry of colloidal silica and refractory flour or into a prime coat slurry of positive sol and refractory flour. The pattern assembly is thoroughly wetted with the prime coat slurry, withdrawn, drained and rotated to insure complete coverage in recessed areas or in blind cores. Stuccoing of the wetted pattern assembly is carried out after each dipping operation, usually with a somewhat coarser grain of the same refractory as used in the slurry. After completing the dipping, the second coat is applied and stuccoed and the dipping process is continued as shown in Table 1 with stuccoing carried out after each dipping operation, preferably with a somewhat coarser grain than that used for the prime coat stucco. However, the same grain system used in the prime coat may also be used in the back-up slurry and as the stucco.

If desired, two prime coats, one of the negative colloidal silica sol slurry and one of the positive sol slurry, although not necessarily in that order, can be used to obtain a quality prime coat suitable for metal casting. Preferably, four or five backup coats are added to these patterns giving a total of six or seven coats. However, as much as 30 coats or more, depending upon the wax pattern assembly, pattern size and configuration may be employed. The larger number of coats are generally used in making shells for massive castings not usually made by the precision investment casting technique.

The dipping time is not critical and 5, 10, 20 and 90 seconds give quality shells. The dipping time required is a function of the complexity of the pattern assembly, but 10 to 60 seconds per dipping operation is typical. Time required to produce a shell with 8 to 10 coats total will be in the range from 10 to 15 minutes, allowing time for drainage and stuccoing. Shells requiring 30 coats are made well within 1½ hours.

DRYING

After the final dipping operation the shell assembly is ready for drying. Drying under ambient conditions for 18 to 24 hours is sufficient to drive off the bulk of the water. Under controlled temperature and humidity conditions of 75°F. and 40% relative humidity, 85–90% of the total amount of water present is evaporated after 24 hours of drying from a six coat shell or 48 hours from an eight coat shell.

Forced air drying at 110°F. for 5 hours is also sufficient to evaporate a comparable quantity of water.

DEWAXING

Dewaxing of the shells may be carried out by the normal procedures available; i.e., flash furnace dewaxing at 1700°–1900°F., steam autoclave dewaxing and solvent vapor dissolving of the wax.

Flash dewaxing is carried out by placing the shell assembly in a furnace previously heated at 1700°–1900°F. At these temperatures the wax is heated and expands, exerting an internal pressure on the shell structure. This pressure is relieved by the wax melting and running out the pouring cup in the shell assembly and also to a lesser extent permeating into the pores of the structures. The shell assemblies of this invention have improved green or unfired strength and do not exhibit cracks or blisters on dewaxing, in spite of the expansion of the wax on dewaxing.

Steam autoclave dewaxing, like furnace flash dewaxing, also depends on rapid heating of the wax and melting of it to relieve the internal pressure on the shell assembly. As a consequence, after loading the shell assemblies in an autoclave, steam pressure is raised as quickly as possible to promote rapid heating of the wax. Shell assemblies dewaxed in a steam autoclave exhibit crack free and blister free surfaces suitable for metal casting.

Solvent vapor elimination of the wax in shell assemblies is carried out with trichloroethylene vapor. The solvent is boiled in a lower portion of a degreasing tank and the vapors penetrate the pores of the refractory shell assembly and immediately dissolve the wax faces adjacent to the refractory investment before the heat of the solvent vapors expands the wax. Subsequently the bulk of the wax pattern is melted, but only after the internal pressure on the shell structure is relieved. Shell assemblies in which the wax is removed by the solvent vapor technique exhibit crack free and blister free shells suitable for metal casting.

MECHANISM AND ADVANTAGES

Although the mechanism by which the gelation of the layers occurs is not completely understood, it is believed that after the stuccoed but negatively charged layer on the coated pattern is submerged into the positive sol-grain slurry, the positively charged particles migrate or are attracted to the negatively charged colloidal silica coating, resulting in an instantaneous coagulation at their interface. At the same time (but at a slower rate) alkali from the colloidal silica coating diffuses into the positive sol coating, neutralizing the acid and further polymerizing the basic aluminum ions on the surface of the preferred positive sol particles. This same polymerization mechanism occurs between the alkaline ionic silicate and the positive sol and creates a continuous gel network around the wet shell which serves two important purposes:

1. It is the adhesive that holds the wet coating together and gives it the necessary strength to withstand redipping, and 2. It acts like a semipermeable membrane allowing water to pass but preventing the passage of alkali. The small amount of alkali that does enter the positive sol layer is neutralized and becomes part of the immobilized layer. As a result the excess positive sol slurry returning to the bath brings little or no alkali with it. This accounts for the unusual stability of the positive sol slurry.

As indicated above, the wet gel strength of the coatings deposited by the process of this invention are high. The wet gel strength is the strength of the wet coating just before redipping into a slurry. If this strength is low, previous coatings will slough off during subsequent dipping operations. Gels from aqueous colloidal silica sols alone are weak and some drying between coats is usually required even where chemical setting agents are used. The preferred positive sol/negative sol coatings of this invention have unusually high wet gel strengths due to the polymerization of surface aluminum atoms on the positive sol particles, thus giving a system of wet coatings that readily withstand repeated (alternate) dippings with no sloughing off.

A further advantage of the process is that no special controls are needed to maintain slurry compositions. In prior art casting practices which contain a drying step between dips the colloidal silica binder, water and grain are consumed at different ratios. As a result the slurry composition is constantly changing. The quality of the shell is very sensitive to slurry composition. Changes in ratios can produce many problems such as weak shells (cracking), high viscosity (poor coverage of patterns), inclusions, "plus" metal and others.

In the present process the ingredients in both slurries are consumed in the essentially same ratios as they exist in the slurries. Therefore, no slurry control techniques are needed. Changes in viscosity which occur due to evaporation can be adjusted simply by adding water periodically. In high volume plants dip tanks can be fed from large master batches and diluted to the desired viscosity with water.

The coatings made by the process of this invention can give refractory shells that are from 15 to 25 percent more porous than shells prepared in conventional manner from aqueous colloidal silica slurries. High porosity allows the water to leave readily during drying and firing. It is also necessary to allow trapped air to escape during metal pouring. The capability of producing shells with high porosity is therefore another valuable attribute of the present invention.

The invention is further illustrated but is not intended to be limited by the following examples in which all parts and percentages are by weight unless otherwise specified.

EXAMPLE 1

A shell mold suitable for precision casting of metals is prepared according to the method of this invention in the following manner.

Two prime coat slurries are prepared by mixing 325 mesh zircon grain (No. 3 flour from Casting Supply House) with Ludox 130M, an acidic, aqueous dispersion of positively charged colloidal particles, and with Ludox SM-30, a basic, aqueous silica sol and stirring each of the two mixtures for 24 hours before use. The compositions, giving a binder solids to zircon ratio of 0.09, are:

| Prime Coat Slurry A | Parts by Wt. |
| --- | --- |
| Zircon flour, 325 mesh | 77.0 |
| Ludox 130M (30% $SiO_2$-$Al_2O_3$) | 23.0 |
| Prime Coat Slurry B | |
| Zircon flour, 325 mesh | 77.0 |
| "Ludox" SM-30 (30% $SiO_2$) | 23.0 |

In the same manner a back-up coat slurry is prepared by mixing 200 mesh molochite grain (No. 6 flour, Casting Supply House) with Ludox 130M and stirring for 24 hours before use. A second back-up slurry is prepared by mixing 200 mesh molochite grain with a solution of "F" Grade Sodium Silicate (Du Pont Company) containing 15% $SiO_2$ and stirring for 24 hours before use.

The compositions, giving a binder solids-to-molochite weight ratio of 0.165 for C and 0.075 for D are:

| Back-Up Coat Slurry C | Parts by Wt. |
| --- | --- |
| Molochite flour, 200 mesh | 64.5 |
| Ludox 130M (30% $SiO_2$-$Al_2O_3$) | 35.5 |
| Back-Up Coat Slurry D | |
| Monochite flour, 200 mesh | 66.7 |
| "F" Grade Sodium Silicate | 33.3 |

A wax pattern is cleaned in methyl ethyl ketone, air dried and dipped into prime coat slurry A until completely wetted. A wetting agent is not needed in A because the positively charged colloid serves this purpose. The pattern is withdrawn and drained of excess slurry and while still wet inserted into a fluidized bed containing zircon stucco grain (No. 1 zircon, −80 to +140 mesh, Casting Supply House). The purpose of stuccoing is to assist in building the mold to the desired thickness, to provide permeability needed in casting metals, and to give a roughened surface for better attachment of the next slurry coat.

Immediately, without drying, the pattern is dipped into prime coat slurry B, thorougly wetted, withdrawn, drained of excess slurry and inserted into the zircon stucco bed. Six back-up coats are then applied, beginning with Slurry C and alternating with Slurry D, each stuccoed with −30 to +60 mesh molochite grain.

Very rapid setting of the back-up coats is seen due to the chemical interaction of the acidic positive colloid with the basic silicate.

Building of the mold through use of this alternate slurry technique requires about 17 minutes.

The air dried, dewaxed and fired mold has no cracks or other defects and is suitable for casting metals. Strength data for the shells of this example show a dramatic and unexpected increase in unfired shell strength when the alkaline silicate binder is substituted for the negative colloidal silica binder liquid.

EXAMPLE 2

It is the object of this example to demonstrate the superiority of the shell molds made by the process of this invention and the criticality of the silica content of the alkaline silicate binder portion of the shell.

Slurries of the composition described in Table 1 were prepared by slow addition of the refractory powders to the well stirred liquid binders. Stirring continued for at least 24 hours prior to use of these slurries to permit the escape of occluded air. When used to make the test shell sections of this example the slurries had the viscosities, density and pH properties shown in Table 1. These properties did not change significantly during the several weeks the slurries were in use, i.e., the slurries had good working stability.

Alkaline silicate slurry D (Table 1) was very thixotropic and would not be suitable for commercial shell dipping because of its poor flowability. It is included herein to demonstrate the criticality of the silica concentration of the alkaline silicate binder.

Four different test shells were constructed, using the slurries of Table 1 and fused silica stuccoes, as depicted in Table 2. The first and second coats and the stuccoes used on all four shell structures were identical. The major difference between these shells was the slurry used for the third, fifth and seventh coats: shell 1 employed a slurry containing negatively charged colloidal silica as the binder liquid whereas shells 2, 3 and 4 employed alkaline silicate solutions containing 9.85, 18 and 20% silica, respectively, as the binder liquid.

The test shells were made in the form of break test bars (approx. ¼ × 1 × 6 inches) and in the form of a wax pattern typifying many of the metal parts made by the investment casting process. The latter pattern will henceforth be referred to as the "widgit" pattern.

The shells were made by the alternate dip process of this invention whereby the pattern is immersed in slurry A, removed and allowed to drain to a uniform wet coating, covered with stucco by application of an excess which was permitted to fall off as the pattern was rotated in air, immersed in slurry B without drying, removed, drained, stuccoed and henceforth as depicted in Table 2. The last slurry coat in each of the four shells was slurry B (Table 1). No stucco was applied to the last coat.

The shells were allowed to dry for 48 hours in air moving at about 100 fpm at 70°–72°F. dry bulb and 60°–62°F. wet bulb.

The shells made in the form of break test bars were used to determine the strength of the shells in the air-dried, unfired state and after firing for 45 min. at 1750°F. and cooling. The measurements made in the unfired state are most meaningful since this is the condition of the shell when it is subjected to the force of the expanding wax pattern during thermal dewaxing in a steam autoclave or gas or electric furnace.

Break test measurements were made on six replicates of each shell by ASTM:C 328–56. The averaged results of these strength measurements are presented in Table 3.

Examination of the strength data for these shells presented in Table 3 shows the dramatic and unexpected increase in unfired shell strength attainable by the use of the alkaline silicate binder in the back-up coatings of the shell instead of the negative colloidal silica binder liquid; a four-fold increase in unfired modulus at rupture was obtained. The data also show the criticality of the $SiO_2$ concentration of the alkaline silicate binder liquid on unfired shell strength; i.e., the silica concentration must be above 10% to be effective and preferably above 15%, the most preferred concentration being in the range of 18–20% silica.

The data of Table 3 also illustrate a major commercial advantage of this invention; i.e., the six-coat shell (4) made with 20% $SiO_2$ alkaline silicate as the binder liquid has an unfired break strength of 3.5 lbs. whereas the eightcoat shell (1) made with negative silica sol as the binder has an unfired break strength of only 1.4 lbs. The shell of this invention is stronger and thinner, requiring the use of less materials and time in its construction and less time to dry. The shells and the process of this invention thus represent a significant and important advance in the art of investment shell making from both a technical and commercial point of view.

The practical importance of the increase in the unfired strength of the shell of this invention made with alkaline silicate instead of negative silica sol as a binder liquid is illustrated by the results obtained when the four shells of this example which were made on the widgit pattern were dewaxed in a steam autoclave for 15 minutes at 110 psi steam pressure.

| Shell No. | Appearance After Autoclave Dewaxing |
|---|---|
| 1 | Cracked; not suitable for casting of metal. |
| 2 | Cracked; not suitable for casting of metal. |
| 3 | No cracks. Good shell mold. |
| 4 | No cracks. Good shell mold. |

Shells made of the widgit and other wax patterns using a shell construction like shells Nos. 3 and 4 of Table 2, were dewaxed in a steam autoclave without cracking, fired at 1700°–1900°F. for 45 min. to 1 hour and then used to cast several types of steels. The castings produced were of high quality in all those respects expected of investment castings.

Shells made of the same patterns using a shell construction like shells Nos. 1 and 2 of Table 2 could not be dewaxed in the steam autoclave without cracking and, therefore, were not suitable for casting of metal. These shells had to be dewaxed in a gas fired or electric furnace to produce shells sufficiently crack-free to be suitable for casting.

TABLE 1

SLURRY COMPOSITIONS

| Slurry Code | Neg. Sol Prime-Coat A | Pos. Sol Back-Up Coat B | Neg. Sol Back-Up Coat C | Alkaline Silicate Slurries Back-Up Coat | | |
|---|---|---|---|---|---|---|
| | | | | D 9.85% SiO$_2$[2] | E 18% SiO$_2$[2] | F 20% SiO$_2$[2] |
| "Ludox" HS (40% SiO$_2$) | 26.3 pts. | | 37.0 pts. | | | |
| "Ludox" 130M (30% SiO$_2$)[1] | | 48.0 pts. | | | | |
| Sodium Silicate Grade 9 | | | | 8.62 pts. | 16.67 pts. | 20.2 pts. |
| Water | 8.1 | | 7.0 | 16.75 | 10.05 | 9.1 |
| Hydroxyacetic Acid (70% soln.) | | 0.96 pts. | | | | |
| "Antarox" BL240[3] | 0.02 | | | | | |
| Fused Silica (−325 mesh)[4] | 70.0 | 50.0 | 50.0 | | | |
| do. (−120 mesh)[4] | | 25.0 | 25.0 | | | |
| do. (−50 & 100 mesh)[4] | | 25.0 | 25.0 | | | |
| Zircon (−325 mesh)[5] | 30.0 | | | 100.0 pts. | 50.0 | 50.0 |
| do. (−140 mesh)[5] | | | | | 25.0 | 25.0 |
| do. (−60 & 150 mesh)[6] | | | | | 25.0 | 25.0 |
| Slurry - Viscosity, Zahn Cup 4 | 45 sec. | 10 sec. | 27 sec. | — | 12 sec. | 11 sec. |
| Density, g./cc. | 2.0 | 1.7 | 1.8 | 2.8 | 2.9 | 2.9 |
| pH | 9.6 | 3.9 | 9.5 | 11.2 | 11.4 | 11.5 |

[1] Positively charged sol; formerly known as Positive Sol 130M, E. I. du Pont de Nemours & Co.
[2] % SiO$_2$ in the liquid binder portion of the slurry, based on 29% SiO$_2$ in No. 9 Sodium Silicate.
[3] Nonionic, low foaming, wetting agent; GAF Corporation.
[4] Tennessee Electro-Minerals Corp., Greenville, Tennessee.
[5] Metal & Thermit Corporation, New York.
[6] E. I. du Pont de Nemours & Co., Grade Florida-T Zircon.

TABLE 2

SHELL CONSTRUCTION

| Shell Number | Coat Number | | | | | | | |
|---|---|---|---|---|---|---|---|---|
| | 1 | 2 | 3 | 4 | 5 | 6 | 7 | 8 |
| Stucco* | S' | S' | S'' | S'' | S'' | S'' | S'' | O |
| 1 | A | B | C | B | C | B | C | B |
| 2 | A | B | D | B | D | B | D | B |
| 3 | A | B | E | B | E | B | E | B |
| 4 | A | B | F | B | F | B | | |

Slurry Codes (see Table 1)
* Stuccoes, Fused Silica, Tennessee Electro-Minerals Corp.
S' = (−50 & 100 mesh)
S'' = (−30 & 50 mesh)
O = no stucco used.

TABLE 3

TEST SHELL STRENGTH[4]

| Shell No.[1] | No. Coats | % SiO$_2$ in Silicate Binder[2] | Unfired | | | Fired[3] | | |
|---|---|---|---|---|---|---|---|---|
| | | | W Lbs. | d in. | M psi. | W Lbs. | d in. | M psi. |
| 1 | 8 | — | 1.4 | 0.23 | 180 | 5.8 | 0.22 | 770 |
| 2 | 8 | 9.85 | 2.1 | 0.29 | 160 | 3.0 | 0.29 | 255 |
| 3 | 8 | 18 | 5.8 | 0.26 | 580 | 8.6 | 0.27 | 740 |
| 4 | 6 | 20 | 3.5 | 0.17 | 800 | 4.0 | 0.17 | 860 |

[1] See Table 2.
[2] See Table 1.
[3] Fired 45 min. at 1750°F., cooled and break tested.
[4] Per ASTM:C 328-56.
Where: W = lbs. force required to break test bar.
d = thickness of test bar, inches.
M = Modulus at rupture, psi.
M = 3WL/2bd$^2$
L / breaking span, 4 inches
b = width of test bar, inches

EXAMPLE 3

Two shell molds are prepared by the process of this invention to demonstrate the improvement in unfired shell strength attained when alkaline silicate solution instead of negative silica sol is used as the liquid binder with zircon as the refractory powder in the slurry.

The four slurries described in Table 4 were prepared as described in Example 1.

Test shells were prepared as in Example 1 using the slurries of Table 4 and the shell constructions of Table 5.

TABLE 4

SLURRY COMPOSITIONS

| Slurry Code | Neg. Sol Prime-Coat Slurry G | Pos. Sol Back-Up Coat Slurry B[7] | Neg. Sol Back-Up Coat Slurry H | Alk. Silicate Soln. Back-Up Coat Slurry I |
|---|---|---|---|---|
| "Ludox" HS (40% SiO$_2$) | 32.2 parts | | 13.92 parts | |
| "Ludox" 130M (30% SiO$_2$)[1] | | 48.0 parts | | |
| Sodium Silicate Grade 9 (20% SiO$_2$) | | | | 33.15 parts |

TABLE 4—Continued

SLURRY COMPOSITIONS

| Slurry Code | Neg. Sol Prime-Coat Slurry<br>G | Pos. Sol Back-Up Coat Slurry<br>B[7] | Neg. Sol Back-Up Coat Slurry<br>H | Alk. Silicate Soln. Back-Up Coat Slurry<br>I |
|---|---|---|---|---|
| Water | 8.95 parts | | 7.42 parts | |
| Hydroxyacetic Acid (70% soln.) | | 0.96 parts | | |
| "Antarox" BL240[2] | 0.02 parts | | | |
| Fused Silica (−325 mesh)[3] | 80.0 parts | 50.0 parts | | |
| do. (−120 mesh)[3] | | 25.0 parts | | |
| do. (−50 & 100 mesh)[3] | | 25.0 parts | | |
| Zircon (−325 mesh)[4] | 20.0 parts | | 50.0 parts | 50.0 parts |
| do. (−140 mesh)[4] | | | 25.0 parts | 25.0 parts |
| do. (−60 & 150 mesh)[5] | | | 25.0 parts | 25.0 parts |
| Slurry - | | | | |
| Viscosity, Zahn Cup No. 4 | 25 sec. | 10 sec. | 10 sec. | 10 sec. |
| Brookfield LVT[6], Spindle No. | 2 | 2 | 2 | 3 |
| Spindle Speed 3 RPM | 300 cps | 300 cps | 350 cps | 5000 cps |
| 6 do. | 325 do. | 325 do. | 350 do. | 2600 do. |
| 12 do. | 325 do. | 275 do. | 350 do. | 1600 do. |
| 30 do. | 300 do. | 230 do. | 300 do. | 860 do. |
| 60 do. | 305 do. | 210 do. | 290 do. | 600 do. |
| Density, g./cc. | 1.88 g/cc | 1.75 g/cc | 3.06 g/cc | 2.78 g/cc |
| pH | 10.0 | 3.5 | 9.7 | 11.7 |

[1] Positively charged sol; formerly known as Positive Sol 130M, E. I. du Pont de Nemours & Co.
[2] Nonionic, low foaming, wetting agent; GAF Corporation.
[3] Tennessee Electro-Minerals Corporation, Greenville, Tenn.
[4] Metal and Thermit Corp., New York.
[5] E. I. du Pont de Nemours & Co., Grade Flordia - T.
[6] Brookfield Eng. Labs., Synchro-Electro Viscometer, Mod. LVT, cps viscosity at variable shear rate.
[7] Same slurry as No. B, Table 1.

TABLE 5

SHELL CONSTRUCTION

| Shell Number | Coat Number | | | | | | | |
|---|---|---|---|---|---|---|---|---|
| | 1 | 2 | 3 | 4 | 5 | 6 | 7 | 8 |
| Stucco* | S′ | S′ | S″ | S″ | S″ | S″ | S″ | O |
| 5 | G | B | H | B | H | B | H | B |
| 6 | G | B | I | B | I | B | I | B |

Slurry Codes (Table 4)
* Stuccoes same as described in Table 2.

Test bars, made and tested as described in Example 1, exhibited strengths as follows:

TABLE 6

TEST SHELL STRENGTH[4]

| Shell No.[1] | No. Coats | % $SiO_2$ in Silicate Binder | Unfired | | | Fired[3] | | |
|---|---|---|---|---|---|---|---|---|
| | | | W Lbs. | d in. | M psi. | W Lbs. | d in. | M psi. |
| 5 | 8 | None | 1.5 | 0.23 | 192 | 4.7 | 0.22 | 614 |
| 6 | 8 | 20 | 4.4 | 0.25 | 444 | 7.1 | 0.26 | 659 |

[1] See Table 5.
[2] See Table 4.
[3] Fired 45 min. at 1750°F., cooled and break tested.
[4] Per ASTM:C 328-56.
Where: W = lbs. force required to break test bar.
d = thickness of test bar, inches.
M = Modulus at rupture, psi.
M = $3WL/2bd^2$
L = breaking span, 4 inches
b = width of test bar, inches The data of Table 6 show a 100% increase in unfired strength for shell 6 made with alkaline silicate compared to shell 5 made with negative silica sol as the liquid binder in half of the back-up coats.

When the widgit pattern invested shells of these two constructions were dewaxed in the steam autoclave for 15 min. at 110 psi, shell 5 was seriously cracked by the process whereas shell 6 dewaxed without cracking. After firing at 1750°F. for 45 min. shell 6 was sound, uncracked and suitable for the casting of metal whereas shell 5 was unsuitable for metal casting.

EXAMPLE 4

Two shell molds are prepared by the process of this invention to demonstrate the improvement in unfired shell strength attained when alkaline silicate solution instead of negative silica sol is used as the liquid binder with "Calamo" alumino-silicate as the refractory powder in the back-up slurries.

"Calamo" is an aluminous fireclay sold by Harbison-Walker Refractories Co. for use in mold mixes for the casting of practically all high-temperature melting metals. It has the following typical chemical analysis:

| | | |
|---|---|---|
| Silica | (SiO$_2$) | 52.8% |
| Alumina | (Al$_2$O$_3$) | 41.6% |
| Titania | (TiO$_2$) | 2.3% |
| Iron Oxide | (Fe$_2$O$_3$) | 1.5% |
| Alkalies | | 1.2% |

Specific Gravity 2.47 g./cc.
Pyrometric Cone Equivalent Temperature "Calamo"  3185°F.
Melting Temperature Pure Silica Sand  3133°F.

Slurries J and K of Table 7 were prepared as described in Example 1. The thixotropic nature of the alkaline silicate solution slurry of the "Calamo" refractory is shown by the Brookfield viscosity data for slurry K in contrast with the nearly Newtonian viscosity of slurry J made with negative silica sol.

The data in Table 9 show a 340% increase in unfired strength for shell 8, made with alkaline silicate in comparison to shell 7 made with negative silica sol as the liquid binder in half of the back-up coats.

When a typical investment casting process wax pattern was invested with shells of these two constructions (Table 8), dried and dewaxed in a steam autoclave for 15 min. at 110 psi., shell 7 was seriously cracked by the process whereas shell 8 was dewaxed without cracking. After firing for 45 min. at 1750°F. shell 8 was sound, uncracked and suitable for the casting of metal whereas shell 7 was unsuitable for casting.

TABLE 7

| | SLURRY COMPOSITIONS | | | |
|---|---|---|---|---|
| | Neg. Sol Back-Up Coat Slurry | Alk. Silicate Soln. Back-Up Coat Slurry | Neg. Sol Back-Up Coat Slurry | Alk. Silicate Soln. Back-Up Coat Slurry |
| Slurry Code | J | K | L | M |
| "Ludox" HS (40% SiO$_2$) | 27.85 parts | | 24.15 parts | |
| Sodium Silicate Grade No. 9 (20% SiO$_2$) | | 58.8 parts | | 58.8 parts |
| Water | 14.85 parts | | 12.9 parts | |
| "Calamo" 200 Alumino-Silicate[1] | 50.0 parts | 50.0 parts | | |
| do. 100 do. | 25.0 parts | 25.0 parts | | |
| do. 85 do. | 25.0 parts | 25.0 parts | | |
| Mullite 200 Alumino-Silicate[1] | | | 50.0 parts | 50.0 parts |
| do. 100 do. | | | 25.0 parts | 25.0 parts |
| do. 5020 do. | | | 25.0 parts | 25.0 parts |
| Slurry - | | | | |
| Viscosity, Zahn Cup No. 4 | 14 sec. | 15 sec. | 11 sec. | 9 sec. |
| Brookfield LVT[6], Spindle No. | 2 | 3 | 2 | 2 |
| Spindle Speed 3 RPM | 450 cps | 3600 cps | 500 cps | 2300 cps |
| 6 do. | 325 | 2300 | 300 do. | 1375 do. |
| 12 do. | 312 | 1450 | 250 do. | 850 do. |
| 30 do. | 290 | 800 | 220 do. | 500 |
| 60 do. | 275 | 530 | 222 do. | 330 |
| Density, g./cc. | 2.0 g/cc | 1.9 g/cc | 2.2 g/cc | 2.0 g/cc |
| pH | 10.0 | 11.6 | 10.0 | 11.7 |

[1] Harbison-Walker Refractories Company.
[6] Brookfield Engineering Labs., Synchro-Electro Viscometer, Mod. LVT; cps vis. at variable shear.

Test shells were prepared as in Example 1 using the G and B slurries of Table 4 and the J and K slurries of Table 7 according to the following shell constructions:

TABLE 8

SHELL CONSTRUCTIONS

| Shell Number | Coat Number | | | | | | | |
|---|---|---|---|---|---|---|---|---|
| | 1 | 2 | 3 | 4 | 5 | 6 | 7 | 8 |
| | Stucco* | | | | | | | |
| 7 | S' G | S' B | C J | C B | C J | C B | C J | O B |
| 8 | G | B | K | B | K | B | K | B |

*Stuccoes:
S' Fused Silica (−50 & 100 mesh) Tennessee Electro-Minerals Co.
C "Calamo" 22 (−16 & 50 mesh) Alumino-silicate, H-N Refractories.
Slurry Codes (Tables 4 & 7)

Shell break test bars were prepared and tested as described in Example 1 with results as follows:

EXAMPLE 5

Two shell molds are prepared by the process of this invention to demonstrate the improvement in unfired shell strength attained when alkaline silicate solution instead of negative silica sol is used as the liquid binder with mullite as the refractory powder in the back-up slurries.

The mullite employed in this example was sold by the Harbison-Walker Refractory Co. for use in the preparation of shell molds for the precision investment casting of metals. It has the following typical chemical analysis:

| | | |
|---|---|---|
| Silica | (SiO$_2$) | 22.4% |
| Alumina | (Al$_2$O$_3$) | 73.5% |
| Titania | (TiO$_2$) | 3.2% |
| Iron Oxide | (Fe$_2$O$_3$) | 0.9% |
| Specific Gravity | | 2.79 g./cc. |

Pyrometric Cone Equivalent Temperature:
H-W Mullite  3310°F.
Silica Sand  3133°F.

TABLE 9

TEST SHELL STRENGTH[4]

| Shell No.[1] | No. Coats | % SiO$_2$ in Silicate Binder[2] | Unfired | | | Fired[3] | | |
|---|---|---|---|---|---|---|---|---|
| | | | W Lbs. | d in. | M psi. | W Lbs. | d in. | M psi. |
| 7 | 8 | None | 2.1 | 0.29 | 173 | 5.3 | 0.29 | 435 |
| 8 | 8 | 20 | 7.0 | 0.28 | 590 | 7.0 | 0.27 | 600 |

[1] See Table 8.
[2] See Table 7.
[3] Fired 45 min. at 1750°F., cooled and break tested.
[4] Per ASTM:C 328-56.
Where W = lbs. force required to break test bar,
d = thickness of test bar, inches.
M = Modulus at rupture, psi.
M = 3WL/2bd$^2$
L = breaking span, 4 inches
b = width of test bar, inches Slurries L and M of Table 7 were prepared as described in Example 1. The thixotropic nature of the alkaline silicate slurry of the mullite refractory is shown by the Brookfield viscosity data for slurry K in contrast to the more nearly Newtonian viscosity of slurry L made with negative silica sol.

Test shells were prepared as described in Example 1 using the G and B slurries of Table 4 and the L and M slurries of Table 7 according to the following shell constructions:

TABLE 10

SHELL CONSTRUCTIONS

| Shell Number | Coat Number | | | | | | | |
|---|---|---|---|---|---|---|---|---|
| | 1 | 2 | 3 | 4 | 5 | 6 | 7 | 8 |
| Stucco* | S' | S' | M | M | M | M | M | O |
| 9 | G | B | L | B | L | B | L | B |
| 10 | G | B | M | B | L | B | L | B |

Slurry Codes (Tables 4 and 7)
*Stuccoes:
S' Fused Silica (−50 & 100 mesh) Tennessee Electro-Minerals Co.
M Mullite 3014 (−30 & 140 mesh) Harbison-Walker Refractories Co.

Shell sections were prepared in the form of test bars and on the widgit wax pattern as described in Example 1. The test bars were break tested as described in Example 1 with results as follows:

TABLE 11

TEST SHELL STRENGTH[4]

| Shell No.[1] | No. Coats | % SiO$_2$ in Silicate Binder[2] | Unfired | | | Fired[3] | | |
|---|---|---|---|---|---|---|---|---|
| | | | W Lbs. | d in. | M psi. | W Lbs. | d in. | M psi. |
| 9 | 8 | None | 1.9 | 0.22 | 237 | 5.4 | 0.23 | 652 |
| 10 | 8 | 20 | 3.5 | 0.21 | 504 | 4.5 | 0.21 | 629 |

[1] See Table 10.
[2] See Table 7.
[3] Fired 45 min. at 1750°F., cooled and break tested.
[4] Per ASTM : C 328-56.
  Where:
    W = lbs. force required to break test bar.
    d = thickness of test bar, inches.
    M = Modulus at rupture, psi.
    M = 3WL/2bd$^2$
    L = breaking span, 4 inches.
    b = width of test bar, inches.

The data of Table 11 show a 100% increase in unfired strength exemplified by modulus of rupture for shell 10 made with alkaline silicate in comparison to shell 9 made with negative silica sol as the liquid binder in half of the backup coats.

When the widgit patterns which had been invested with shells 9 and 10 of Table 10 were dewaxed in the steam autoclave for 15 min. at 110 psi, shell 9 was seriously cracked by the process whereas shell 10 was dewaxed without cracking. After firing for 45 min. at 1750°F., shell 10 was sound, uncracked and suitable for metal casting whereas shell 7 was unsuitable for casting.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as set forth in the claims.

We claim:

1. In a process for forming a refractory laminate on the surface of a substrate by dipping the substrate alternately, in either order, into (A) a slurry of particulate refractory material in a sol of negatively charged colloidal particles selected from the group consisting of silica, bentonite, attapulgite and kaolinite and (B) a slurry of a particulate refractory material in a sol of positively charged colloidal particles selected from the group consisting of alumina and silica particles coated with a polyvalent metal-oxygen compound and repeating the alternate dips until a laminate of the desired thickness is obtained, the improvement which comprises substituting (C) a slurry of zircon, alumina or an aluminosilicate in a solution of a sodium, potassium, lithium or quaternary ammonium silicate for (A) in the third or fifth dip when the first dip is (A) or in the fourth dip when the first dip is (B) and repeating (C) and (B) until a laminate of the desired thickness is built up on the substrate.

2. The process of claim 1 wherein the first dip is (A), the third dip is (C) and the laminate has six layers.

3. The process of claim 1 wherein stucco is applied after each dip.

4. The process of claim 1 wherein (B) is a slurry of particulate refractory material in a sol of colloidal silica particles coated with alumina.

5. The process of claim 1 wherein said refractory laminate is an expendable refractory shell mold.

6. The process of claim 5 wherein the first dip is (A), the third dip is (C) and the laminate has six layers.

7. The process of claim 5 wherein stucco is applied after each dip.

8. The process of claim 5 wherein (B) is a slurry of particulate refractory material in a sol of colloidal silica particles coated with alumina.

9. The process of claim 5 wherein the pattern is first dipped into a first prime coat slurry comprising a relatively fine refractory grain in a sol of negatively charged colloidal silica particles, then dipped into a backup coat slurry comprising coarser refractory grain in a sol of positively charged alumina-coated particles, then dipped into a back up coat slurry of a coarser refractory grain selected from the group consisting of zircon, alumina and an alumino-silicate in a solution of an alkaline ionic silicate followed by a back up coat slurry of a coarser refractory grain in a sol of positively charged alumina-coated particles and the last two steps are repeated until the desired thickness is obtained.

10. The process of claim 5 wherein the first dip is (A) and the fifth dip is (C).

11. The process of claim 5 wherein the first dip is (B).

12. The process of claim 1 wherein the first dip is (A) and the fifth dip is (C).

13. The process of claim 1 wherein the first dip is (B).

14. A refractory laminate having improved green strength which comprises a series of sequential layers, in either order of (A) a gel of negatively charged colloidal particles selected from the group consisting of silica, bentonite, attapulgite and kaolinite and (B) a gel of positively charged colloidal particles selected from the group consisting of alumina and silica particles coated with a polyalent metal - oxygen compound wherein (C) a gel of a sodium, potassium, lithium or quaternary ammonium silicate is substituted for (A) in the third or fifth layer when the first layer is (A) or in the fourth layer when the first layer is (B) and further layers of (C) and (B) until the desired thickness is obtained.

15. The refractory laminate of claim 14 wherein the positively charged colloidal particles are alumina-coated colloidal silica particles.

16. The refractory laminate of claim 14 wherein the gel layers are separated by intermediate layers of particulate refractory material.

17. The refractory laminate of claim 14 wherein the first layer is (A).

18. The refractory laminate of claim 14 wherein the first layer is (B).

19. The refractory laminate of claim 14 wherein the sequential layers are supported on a substrate.

* * * * *